United States Patent
Kaplan et al.

(10) Patent No.: US 12,371,269 B2
(45) Date of Patent: *Jul. 29, 2025

(54) CENTER TRACKING DUAL SYNCHRONOUS BELT SYSTEM

(71) Applicant: ContiTech Deutschland GmbH, Hannover (DE)

(72) Inventors: Jacob Kaplan, Omaha, NE (US); Christopher Ganshert, Lincoln, NE (US); Ben Roberts, Lincoln, NE (US)

(73) Assignee: ContiTech Deutschland GmbH, Hannover (DE)

( * ) Notice: Subject to any disclaimer, the term of this patent is extended or adjusted under 35 U.S.C. 154(b) by 976 days.

This patent is subject to a terminal disclaimer.

(21) Appl. No.: 17/303,904

(22) Filed: Jun. 10, 2021

(65) Prior Publication Data

US 2022/0396429 A1    Dec. 15, 2022

(51) Int. Cl.
*B65G 15/44*    (2006.01)
*A01D 45/02*    (2006.01)
(Continued)

(52) U.S. Cl.
CPC ........... *B65G 15/44* (2013.01); *A01D 45/023* (2013.01); *B65G 15/52* (2013.01); *B65G 17/44* (2013.01);
(Continued)

(58) Field of Classification Search
None
See application file for complete search history.

(56) References Cited

U.S. PATENT DOCUMENTS

| 1,056,727 A | 3/1913 | Asper |
| 3,338,107 A | 8/1967 | Carl et al. |

(Continued)

FOREIGN PATENT DOCUMENTS

| CN | 102001412 A | 4/2011 |
| CN | 110182542 A | 8/2019 |

(Continued)

OTHER PUBLICATIONS

International Search Report and Written Opinion dated Sep. 23, 2022 of International Application PCT/EP2022/064379 which claim application that are incorporated herein by reference thereto.

(Continued)

*Primary Examiner* — William R Harp
(74) *Attorney, Agent, or Firm* — Gregory Adams; Richard A. Wolf

(57) ABSTRACT

Synchronous belt systems include two or more sprockets, a first endless belt, and a second endless belt. The belts are connected together with belts attachment hardware through belt ports, and a belts gap is defined between the belts. Each of the sprockets includes sprocket teeth and sprocket tooth spaces between adjacent teeth of the sprocket teeth, and each of the sprockets has a sprocket center ridge. The belts each include a plurality of belt teeth which engage sprocket tooth spaces. The belts gap engages the sprocket center ridge of each of the sprockets. Each of the belts attachment hardware includes a connecting bar which renders a parallel and adjacent configuration of the first endless belt and the second endless belt.

9 Claims, 3 Drawing Sheets

(51) Int. Cl.
  *B65G 15/52* (2006.01)
  *B65G 17/44* (2006.01)
  *B65G 23/06* (2006.01)
(52) U.S. Cl.
  CPC ........ *B65G 23/06* (2013.01); *B65G 2201/042* (2013.01)

(56) References Cited

U.S. PATENT DOCUMENTS

| | | | |
|---|---|---|---|
| 3,853,016 A | 12/1974 | Lane, III et al. | |
| 3,853,359 A * | 12/1974 | Pusch | B62D 55/24 305/47 |
| 4,072,062 A | 2/1978 | Morling et al. | |
| 4,805,388 A | 2/1989 | Kell | |
| 4,899,868 A | 2/1990 | Johnson | |
| 5,921,070 A | 7/1999 | Chamberlain | |
| 7,281,365 B2 | 10/2007 | Zürn et al. | |
| 7,874,134 B1 | 1/2011 | Hoffman | |
| 8,136,827 B2 | 3/2012 | Lumpkin | |
| 8,480,109 B1 | 7/2013 | Adams | |
| 8,596,447 B2 | 12/2013 | Gentz | |
| 9,717,182 B2 | 8/2017 | Rittershofer et al. | |
| 10,647,516 B2 | 5/2020 | Peters et al. | |
| 12,054,341 B2 * | 8/2024 | Kaplan | B65G 15/46 |
| 2011/0011048 A1 | 1/2011 | Hoffman | |
| 2011/0049831 A1 | 3/2011 | Lumpkin | |
| 2014/0106917 A1 * | 4/2014 | Yuan | F16H 55/171 474/148 |
| 2016/0037724 A1 | 2/2016 | Rittershofer et al. | |
| 2017/0172064 A1 | 6/2017 | VanNahmen et al. | |
| 2019/0141894 A1 | 5/2019 | Feuerborn et al. | |
| 2020/0196529 A1 | 6/2020 | Schwefe et al. | |
| 2022/0396428 A1 * | 12/2022 | Kaplan | B65G 15/12 |

FOREIGN PATENT DOCUMENTS

| | | |
|---|---|---|
| DE | 102013226436 A1 | 6/2015 |
| DE | 102018219554 A1 | 5/2019 |
| DE | 102018112047 A1 | 11/2019 |
| DE | 102019213022 A1 | 3/2021 |
| EP | 0098336 A1 | 1/1984 |
| EP | 2191711 A1 | 6/2010 |
| EP | 2890916 A1 | 7/2015 |
| EP | 3673724 A1 | 7/2020 |
| TW | 201328933 A | 7/2013 |
| WO | 2013016381 A2 | 1/2013 |
| WO | 2021003168 A1 | 1/2021 |

OTHER PUBLICATIONS

International Search Report and Written Opinion dated Oct. 19, 2022 of International Application PCT/EP2022/064709 claiming priority this application.

* cited by examiner

CENTER TRACKING DUAL SYNCHRONOUS BELT SYSTEM

FIELD

The field to which the disclosure generally relates to is synchronous belt systems for conveying, reaping or otherwise moving materials such as crops, grains, silage, particulates, sunflower, stone, sawdust, and the like.

BACKGROUND

This section provides background information to facilitate a better understanding of the various aspects of the disclosure. It should be understood that the statements in this section of this document are to be read in this light, and not as admissions of prior art.

When conventional belt conveying systems are used in harsh conditions, it is difficult to rely on flanged pulleys to sufficiently track the belts because debris accumulates on the side flanges of the pulleys. This ultimately results in belt misalignment, belt removal from the system, or even belt failure.

In some instances, a center track configuration is employed where a center flange on a pulley keeps the belt aligned. This allows debris to be cleared from the sides of the pulley. However, this configuration uses a single grooved belt where the groove is located in the center of the belt on the side which engages the pulley. Also, the belt is absent of teeth which leads to inefficient engagement with the pulley. Furthermore, manufacturing such belts with a center groove requires significant cost, effort and time, since the center groove must be molded or milled into the single belt. Molded grooves required complex cure mold configurations and can often only cure one belt at a time. Milled center groove belts require an additional process and equipment.

Thus, there is a need for improved belt systems which address the above described problems, and such needs are met, at least in part, with embodiments according to this disclosure.

SUMMARY

This section provides a general summary of the disclosure, and is not a necessarily a comprehensive disclosure of its full scope or all of its features.

In a first aspect of the disclosure, synchronous belt systems include two or more sprockets, a first endless belt, and a second endless belt. The first endless belt and the second endless belt are connected together with belts attachment hardware through belt ports, and a belts gap is defined between the first endless belt and the second endless belt. Each of the sprockets includes sprocket teeth and sprocket tooth spaces between adjacent teeth of the sprocket teeth, and each of the sprockets has a sprocket center ridge. The first endless belt and the second endless belt include a plurality of belt teeth. The belts gap engages the sprocket center ridge of each of the sprockets. In some cases, the synchronous belt system consists of two sprockets.

Each of the belts attachment hardware includes a connecting bar which renders a parallel and adjacent configuration of the first endless belt and the second endless belt. According to some aspects, the belts attachment hardware has a connecting bar in contact with the surfaces of first endless belt and the second endless belt, and the connecting bar is attached with any suitable device, such as, but not limited to rivets, screws, swages, press fit devices, and the like. According to some other aspects, the belts toothed attachment hardware is a belts toothed attachment hardware which includes feature connectors, at least one connecting bar, a first attachment tooth, and a second attachment tooth, and the first attachment tooth and second attachment tooth are disposed against tooth sides of the first endless belt and the second endless belt, respectively.

In yet some other aspects of the disclosure, the synchronous belt systems further include a plurality of conveying lugs, or other material manipulating features or devices, and each are connected together with the belts attachment hardware through the belt ports.

The synchronous belt systems may have the plurality of sprockets connected to material manipulating equipment, and one of the sprockets is mounted to a drive shaft and the other(s) is/are mounted to an idler shaft(s). In some cases, the material manipulating equipment is crop conveying equipment. Also, the crop conveying equipment may be, but is not limited to, a crop gathering head of a harvester, and in such cases the synchronous belt systems may be used to gather crop, cut the crop, convey the crop, or otherwise manipulate the crop.

In some other aspects, the plurality of sprockets is connected to material cutting equipment, and a plurality of material cutting features may be connected to the first endless belt and the second endless belt with the belts attachment hardware through the belt ports. In some cases, the material cutting features are crop cutting features.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
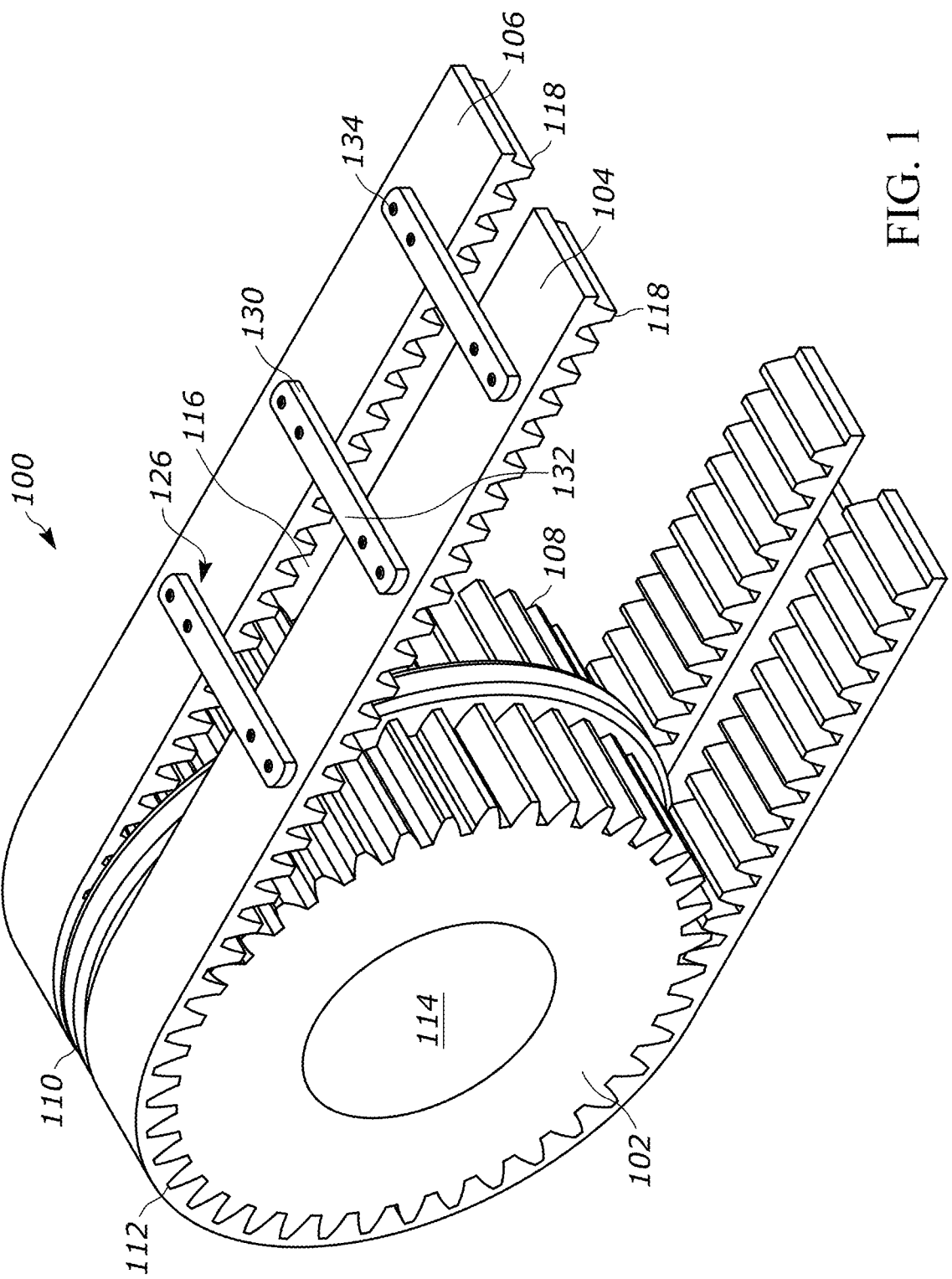
FIG. 1 depicts a portion of a synchronous belt system embodiment in a perspective view, in accordance with the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosures are synchronous belt systems for conveying, cutting or otherwise manipulating materials. The synchronous belt systems include a pair of endless belts which are positioned adjacent one another and mechanically, or otherwise physically attached. The synchronous belts engage two or more sprockets, which may have a smooth periphery or toothed periphery. Each sprocket includes a ridge which extends upward from the periphery and such ridge is positioned at any position inward from the outer axial edges of the sprocket. This sprocket configuration enables consistent alignment and center tracking of the synchronous belts as a gap between the synchronous belts engages with the ridge of each sprocket. The synchronous belts may include lugs, paddles, blades, or any other suitable feature(s) which interact with materials, and each is mechanically or physically attached to the synchronous belts. The synchronous belt systems according to this disclosure may be used or designed in similar or like ways as disclosed in U.S. patent application Ser. No. 17/303,902, titled "Center Tracking Dual Synchronous Belt System", filed Jun. 10, 2021, and the entire contents of this application are incorporated herein by reference thereto.

The synchronous belts and lugs/manipulating features are matingly attached with one another with any suitable means, such as attachment hardware. Such attachment hardware may be metal or non-metal (i.e. urethane or rubber) which is bonded onto a side of each of the separate synchronous belts.

In those embodiments where the synchronous belts engage sprockets having a toothed periphery, the space defined between two adjacent teeth enable the synchronous belts to engage the sprocket without interference with the attachment hardware, and results in smooth/long lasting operation of the system. The synchronous belts each have belt teeth.

Now referencing FIG. 1 which depicts a portion of one synchronous belt system according to the disclosure, in a perspective view. Synchronous belt system 100 generally includes sprocket 102, first belt 104 and second belt 106 which are positioned mutually adjacent and parallel one another. In some aspects, the belts are so-called small pitch belts.

Figure 2:
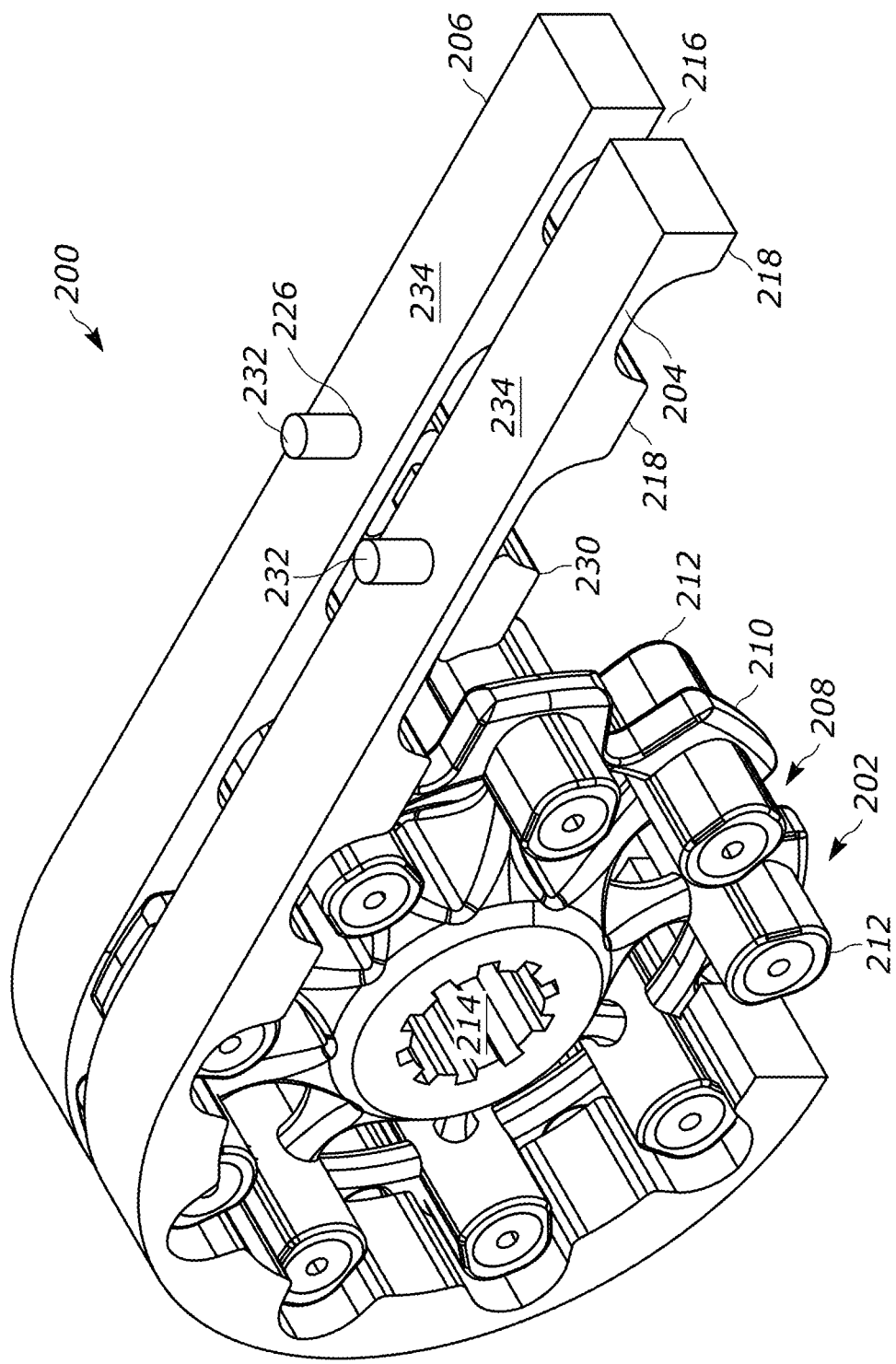
FIG. 2 shows a portion of another synchronous belt system embodiment in a perspective view, in accordance with the disclosure; and, FIG. 3 illustrates a one type of belts attachment hardware in a perspective view, in accordance with the disclosure.

While one sprocket is shown in the partial view of FIG. 1, and FIG. 2, system configurations with two, three, four, five, etc. sprockets are within the scope of the disclosure. The sprocket 102 defines tooth space 108 and includes a sprocket ridge 110 shown generally in the center, but which could be skewed either side of the center circumferential longitudinal line (also commonly referred to as an equatorial line) of the sprocket 102. Sprocket 102 also includes sprocket teeth 112 (numerous shown) where two adjacent sprocket teeth 112 together define a tooth space 108 therebetween. While a multitude of sprocket teeth 112 are shown, embodiments of the disclosure are not limited thereto, and any suitable number of sprocket teeth may be used. Sprocket 102 further includes a mounting port 114 which is used in conjunction with a fastener, such as a bolt, quick disconnect (QD) bushing, taper bushing and the like, to secure sprocket 102 to a drive shaft, equipment frame, an idler shaft, or any other suitable material conveying/manipulating equipment or device.

Sprockets according to the disclosure may be formed of any suitable metal or non-metal. Some non-limiting example of non-metal materials include castable polymer materials, such as polyurethane polymers, polyester polymers, epoxy polymers, and the like. Non-limiting examples of materials, as well as designs for, forming the sprocket may also be found in U.S. Pat. No. 10,865,868 B2, of which the entire contents are incorporated herein by reference thereto. Some further non-limiting examples of materials, as well as designs for, forming the sprocket may also be found in U.S. patent application Ser. No. 17/062,570, titled "Composite Sprocket", filed Oct. 3, 2020, and the entire contents of this application are incorporated herein by reference thereto.

Synchronous belt system 100 further includes a belts gap 116 formed between first belt 104 and second belt 106. The belts gap 116 enables consistent alignment of first belt 104 and second belt 106 while in use with material. Each of first belt 104 and second belt 106 include a plurality of belt teeth 118. As depicted in FIG. 1, first belt 104 and second belt 106 both are adjacent one another and run along same sprocket 102 in a side-by-side parallel manner. The gap 116 formed between first belt 104 and second belt 106 enables sprocket ridge 110 of sprocket 102 to help maintain alignment of first belt 104 and second belt 106.

Additionally, each of first belt 104 and second belt 106 belt includes ports 126 which function accommodate a device(s) for matingly securing first belt 104, second belt 106 and, in some cases, a corresponding manipulating feature, together. It is within the scope of the disclosure to employ any suitable material manipulating feature(s). Any suitable device(s) for matingly securing may be used, for example, belts attachment hardware 130. In some aspects of the disclosure, belts attachment hardware 130 includes a connecting bar 132, connectors 134 (twelve shown), and the connecting bar 132 is matingly disposed on the outer sides 136 of the first endless belt 104 and the second endless belt 106, while connectors 134 through pass through belt ports 126. The connectors 134 may be any suitable device for securing connecting bar 132, such as, but not limited to rivets, screws, swages, press fit devices, and the like. The connecting bar 132 may be formed from metal, fabric, textile, rubber calendered fabric or textile, and the like. In some cases, the connecting bar 132 is a fabric or textile, which is riveted to the first endless belt 104 and the second endless belt 106.

Now referencing FIG. 2 which depicts another synchronous belt system according to the disclosure. Synchronous belt system 200 generally includes sprocket 202, first endless belt 204 and second endless belt 206 which are positioned mutually adjacent and parallel one another.

The sprocket 202 defines tooth space 208 and includes a sprocket ridge 210 shown generally in the center, but which could be skewed either side of the center circumferential longitudinal line of the sprocket 202. Sprocket 202 also includes sprocket teeth 212 (eight shown) where two adjacent sprocket teeth 212 together define a tooth space 208 therebetween. Sprocket 202 further includes a mounting port 214 which is used in conjunction with a fastener, to secure sprocket 202 to a drive shaft, equipment frame, an idler shaft, or any other suitable material conveying/manipulating equipment or device. Synchronous belt system 200 further includes a belts gap 216 formed between first belt 204 and second belt 206. The belts gap 216 enables consistent alignment of first belt 204 and second belt 206 while in use with material. Each of first belt 204 and second belt 206 include a plurality of belt teeth 218. As depicted in FIG. 2, first belt 204 and second belt 206 both are adjacent one another and run along same sprocket 202 in a side-by-side parallel manner. The gap 216 formed between first belt 204 and second belt 206 enables sprocket ridge 210 of sprocket 202 to help maintain alignment of first belt 204 and second belt 206.

Each of first belt 204 and second belt 206 includes belt ports 226 which accommodate a device(s) for matingly securing first belt 204, second belt 206 and, in some cases, a corresponding manipulating feature, together. As shown in FIG. 2, belts attachment hardware is a belts toothed attachment hardware 230, which is described in greater detail in FIG. 3, below. Belts toothed attachment hardware 230 include feature connector 232 which pass from the toothed side of each belt and through the outer side 234 of each of first belt 204 and second belt 206. Feature connectors 232 are used to connect with any suitable material manipulating feature(s) or device(s).

Figure 3:
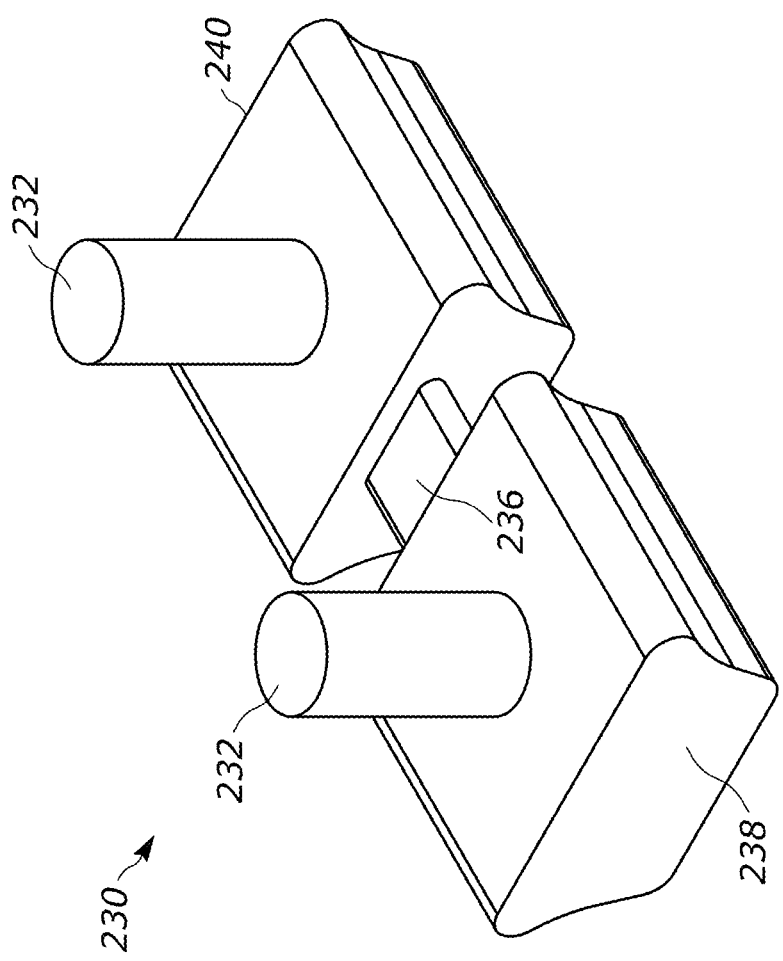

FIG. 3 illustrates belts toothed attachment hardware 230 in more detail. Belts toothed attachment hardware 230 includes feature connectors 232, connecting bar 236, first attachment tooth 238 and second attachment tooth 240. The surfaces of first attachment tooth 238 and second attachment tooth 240 are disposed against the tooth sides of first belt 204 and second belt 206, respectively, which are the opposing sides of the belt outer sides 234 (as shown in FIG. 2). Connecting bar 236 may provide connection between feature connectors 232, first attachment tooth 238, second attachment tooth 240, first belt 204 and second belt 206.

Generally, each of first belt and second belt, or any belts according to the disclosure, include a belt carcass having parallel layers of polymeric flexible, resilient material. For example, polymeric materials which include the moldable natural or synthetic rubbers, or castable rubbers or urethanes may be used. Materials used to form the belt carcass may be like materials in some cases, while in some other cases, dissimilar materials. For example, in one aspect, the gathering belt carcass may be based upon a conventional rubber, while the attachable lug, or other material manipulating features or devices, may be based upon a resilient polyurethane material.

Any suitable rubbers or other materials may also be used for forming the belt carcasses, teeth or attachable lugs, features or devices, in accordance with the disclosure. Examples include, without limitation, synthetic polyisoprenes, polybutadienes, acrylonitrile butadiene rubber, styrene acrylonitrile butadiene rubber, polychloroprene rubber, styrene-butadiene copolymer rubber, isoprene-isobutylene copolymer rubber and its halogenated derivatives, ethylenepropylene-diene copolymer rubbers such as ethylene-propylene-cyclopentadiene terpolymer, ethylene-propylene ethylidene norbornene terpolymer, and ethylene-propylene-I, 4-hexadiene terpolymer, butadiene-propylene copolymer rubber, butadiene-ethylene copolymer rubber, butadiene-isoprene copolymer, polypentenamer, styrene-butadiene-styrene block copolymers, epoxidized natural rubber and their mixtures. In general, such compounds are characterized by repeating olefinic unsaturation in the backbone of the polymer, which generally arises from the presence of butadiene or isoprene monomers in the polymer structure. Urethane materials formed by reacting isocyanate materials with polyester polyols, polyether polyols, polyacrylic polyols, and the like, may be used in compounds forming gathering belt carcasses and/or attachable lugs, or other material manipulating features or devices. In some alternative embodiments of the disclosure the lugs, or other material manipulating features or devices, made be formed from metal(s).

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

| List of reference numerals (part of the specification): | |
|---|---|
| 100 | Synchronous belt system |
| 102 | Sprocket |
| 104 | First endless belt |
| 106 | Second endless belt |
| 108 | Sprocket tooth space |
| 110 | Sprocket center ridge |
| 112 | Sprocket teeth |
| 114 | Sprocket mounting port |
| 116 | Belts gap |
| 118 | Belt teeth |
| 126 | Belt port |
| 130 | Belts attachment hardware |
| 132 | Connecting bar |
| 134 | Connector |
| 136 | Belt outer side |
| 200 | Synchronous belt system |
| 202 | Sprocket |
| 204 | First endless belt |
| 206 | Second endless belt |
| 208 | Sprocket tooth space |
| 210 | Sprocket center ridge |
| 212 | Sprocket teeth |
| 214 | Sprocket mounting port |
| 216 | Belts gap |
| 218 | Belt teeth |
| 226 | Belt port |
| 230 | Belts toothed attachment hardware |
| 232 | Feature connector |
| 234 | Belt outer side |
| 236 | Connecting bar |
| 238 | First attachment tooth |
| 240 | Second attachment tooth |

What is claimed is:

1. A synchronous belt system comprising a plurality of sprockets, a first endless belt, and a second endless belt;
   wherein the first endless belt and the second endless belt are connected together with belts attachment hardware and wherein a belts gap is defined between the first endless belt and the second endless belt;
   wherein each of the plurality of sprockets comprises sprocket teeth and sprocket tooth spaces between adjacent teeth of the sprocket teeth, and wherein each of the plurality sprockets comprise a sprocket center ridge;
   wherein the belts gap engages the sprocket center ridge of each of the plurality of sprockets; and,
   wherein the belts attachment hardware comprises a connecting bar which renders a parallel and adjacent configuration of the first endless belt and the second endless belt.

2. The synchronous belt system according to claim 1, wherein each of the sprockets comprises a sprocket mounting port.

3. The synchronous belt system according to claim 1, wherein the plurality of sprockets consists of two sprockets.

4. The synchronous belt system according to claim 1, wherein the first endless belt and the second endless belt are connected together with the belts attachment hardware through belt ports, and wherein the belts attachment hardware is disposed on the outer side of both the first endless belt and the second endless belt.

5. The synchronous belt system according to claim 4, wherein the belts attachment hardware comprises connectors attached to each of the first endless belt and the second endless belt.

6. The synchronous belt system according to claim 5, wherein the connectors are selected from one or more of rivet, screw, swage, and press fit devices.

7. The synchronous belt system according to claim 1, wherein the plurality of sprockets consists of two sprockets, and wherein one of the two sprockets is mounted to a drive shaft and the other of the two sprockets is mounted to an idler shaft.

8. A synchronous belt system comprising a plurality of sprockets, a first endless belt, and a second endless belt;
   wherein the first endless belt and the second endless belt are connected together with belts attachment hardware and wherein a belts gap is defined between the first endless belt and the second endless belt;
   wherein each of the plurality of sprockets comprises sprocket teeth and sprocket tooth spaces between adjacent teeth of the sprocket teeth, and wherein each of the plurality sprockets comprise a sprocket center ridge;
   wherein the belts gap engages the sprocket center ridge of each of the plurality of sprockets;
   wherein the belts attachment hardware comprises a connecting bar which renders a parallel and adjacent configuration of the first endless belt and the second endless belt; and
   wherein the connecting bar comprises fabric or textile in contact with the first endless belt and the second endless belt, and wherein the belts attachment hardware comprises rivets attached to each of the first endless belt and the second endless belt.

9. A synchronous belt system comprising a plurality of sprockets, a first endless belt, and a second endless belt;
   wherein the first endless belt and the second endless belt are connected together with belts attachment hardware and wherein a belts gap is defined between the first endless belt and the second endless belt;
   wherein each of the plurality of sprockets comprises sprocket teeth and sprocket tooth spaces between adjacent teeth of the sprocket teeth, and wherein each of the plurality sprockets comprise a sprocket center ridge;
   wherein the belts gap engages the sprocket center ridge of each of the plurality of sprockets;
   wherein the belts attachment hardware comprises a connecting bar which renders a parallel and adjacent configuration of the first endless belt and the second endless belt;

wherein the first endless belt and the second endless belt are connected together with the belts attachment hardware through belt ports;

wherein the belts attachment hardware further comprises a first attachment tooth, and a second attachment tooth; and, wherein the first attachment tooth and the second attachment tooth are disposed against tooth sides of the first endless belt and the second endless belt, respectively.

* * * * *